US009443140B2

(12) United States Patent
Yoshida

(10) Patent No.: US 9,443,140 B2
(45) Date of Patent: Sep. 13, 2016

(54) PAPER SHEETS PROCESSING APPARATUS AND DATA TRANSFER METHOD

(71) Applicant: Kabushiki Kaisha Toshiba, Tokyo (JP)

(72) Inventor: Kazuhisa Yoshida, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/638,098

(22) Filed: Mar. 4, 2015

(65) Prior Publication Data

US 2015/0262381 A1 Sep. 17, 2015

(30) Foreign Application Priority Data

Mar. 11, 2014 (JP) ................................ 2014-048185

(51) Int. Cl.

| G06Q 40/00 | (2012.01) |
| G07D 11/00 | (2006.01) |
| G07F 19/00 | (2006.01) |
| G06K 9/00 | (2006.01) |
| B65H 7/20 | (2006.01) |
| G07D 7/20 | (2016.01) |
| G07D 7/12 | (2016.01) |
| G07D 7/18 | (2006.01) |

(52) U.S. Cl.
CPC ............. G06K 9/00483 (2013.01); B65H 7/20 (2013.01); G07D 7/12 (2013.01); G07D 7/18 (2013.01); G07D 7/20 (2013.01); G07D 11/0051 (2013.01)

(58) Field of Classification Search
USPC .................................................. 235/379, 381
See application file for complete search history.

(56) References Cited

U.S. PATENT DOCUMENTS

| 4,760,923 A * | 8/1988 | Lundblad | B65H 9/166 |
| | | | 209/534 |
| 5,198,975 A * | 3/1993 | Baker | G06K 17/00 |
| | | | 235/379 |
| 5,848,400 A * | 12/1998 | Chang | G06Q 20/04 |
| | | | 235/379 |
| 7,475,807 B2 * | 1/2009 | Halpin | G06Q 20/042 |
| | | | 235/378 |
| 8,335,367 B2 * | 12/2012 | Nireki | G07D 7/121 |
| | | | 209/534 |
| 8,401,268 B1 * | 3/2013 | Yacoubian | G07D 11/0084 |
| | | | 235/379 |
| 8,428,332 B1 * | 4/2013 | Csulits | G07F 19/20 |
| | | | 235/379 |

(Continued)

FOREIGN PATENT DOCUMENTS

| JP | 2006293625 A | 10/2006 |
| KR | 20120022213 A | 3/2012 |
| WO | 2012064672 A1 | 5/2012 |

OTHER PUBLICATIONS

Extended European Search Report issued in related European Patent Application No. EP15157755.8, mailed on Jul. 28, 2015 (6 pages).

(Continued)

Primary Examiner — Tuyen K Vo
(74) Attorney, Agent, or Firm — Baker Botts L.L.P.

(57) ABSTRACT

According to one embodiment, a paper sheets processing apparatus includes a first sub controller, a second sub controller, and a main controller. The first sub controller generates image data, based on an output signal from a camera which captures an image of a banknote transported along a transport path. The second sub controller generates sensor data, based on an output signal from a sensor which measures the banknote. The main controller inputs the image data and the sensor data of the same banknote from the first sub controller and the second sub controller, and transfers the image data and the sensor data to one external device indicated from a plurality of external devices.

17 Claims, 7 Drawing Sheets

(56) References Cited

U.S. PATENT DOCUMENTS

| | | | | |
|---|---|---|---|---|
| 8,763,897 B1* | 7/2014 | Enright | ............... | G06Q 40/02 235/379 |
| 2004/0056084 A1* | 3/2004 | Skinner | ............... | G07D 7/16 235/379 |
| 2005/0127160 A1* | 6/2005 | Fujikawa | ............... | G06Q 20/04 235/379 |
| 2007/0152034 A1* | 7/2007 | Dietz | ............... | G07D 7/00 235/379 |
| 2008/0135610 A1* | 6/2008 | Roh | ............... | G06K 9/186 235/379 |
| 2010/0306111 A1* | 12/2010 | Slater | ............... | G06Q 20/04 705/45 |
| 2012/0101946 A1 | 4/2012 | Jones | | |

OTHER PUBLICATIONS

Zhang Jian et al: "The Study of Embedded Processing System on High-Speed Banknote Sorting Device", Proceedings of SPIE, S P I E—International Society for Optical Engineering, US vol. 9045, Dec. 19, 2013, pp. 9045OM-9045OM, XP060032214, ISSN: 0277-786X, DOI: 10.1117/12.2034253 ISBN: 978-1-62841-467-7.

Anonymous: "Load Balancing Definition", Jul. 15, 2015, XP055202440, Retrieved from the internet: URL:http://techterms.com/definition/loadbalancing [retrieved on Jul. 15, 2015].

* cited by examiner

PAPER SHEETS PROCESSING APPARATUS AND DATA TRANSFER METHOD

CROSS-REFERENCE TO RELATED APPLICATION

This application is based upon and claims the benefit of priority from Japanese Patent Application No. 2014-048185, filed on Mar. 11, 2014; the entire contents of which are incorporated herein by reference.

FIELD

Embodiments described herein relate generally to a paper sheets processing apparatus and a data transfer method.

BACKGROUND

A paper sheets processing apparatus is well known. In this apparatus, a detector to detect information to discriminate a denomination and authenticity of the paper sheet, or information to detect unfitness of the paper sheet, is equipped. By using the detector, paper sheets having unfitness are excluded, and paper sheets are sealed into respective denominations. In case of discriminating the denomination or both sides of the banknote, image data of the paper sheet is used. Accordingly, in case of discriminating respective denominations of a plurality of paper sheets continuously inputted, the processing load is concentrated into the processing apparatus. In order to resolve this problem, the processing apparatus having high performance is necessary.

DETAILED DESCRIPTION

According to one embodiment, a paper sheets processing apparatus includes a first sub controller, a second sub controller, and a main controller. The first sub controller generates image data, based on an output signal from a camera which captures an image of a banknote transported along a transport path. The second sub controller generates sensor data, based on an output signal from a sensor which measures the banknote. The main controller inputs the image data and the sensor data of the same banknote from the first sub controller and the second sub controller, and transfers the image data and the sensor data to one external device indicated from a plurality of external devices.

Various embodiments will be described hereinafter with reference to the accompanying drawings. Hereinafter, a paper sheets processing system of one embodiment will be explained by referring to Figures.

Figure 1:
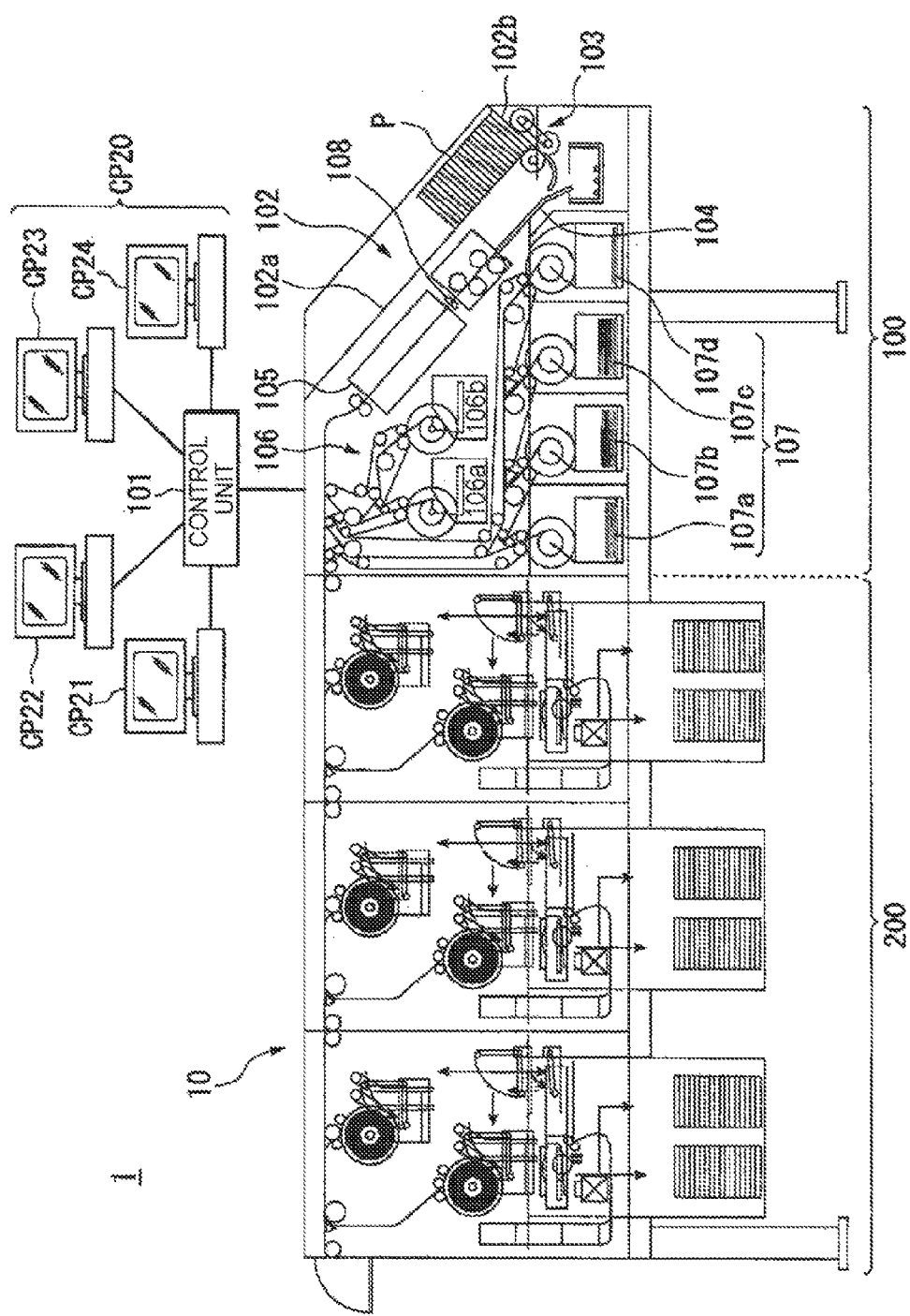
FIG. 1 is a schematic diagram of a paper sheets processing system 1 according to one embodiment.

FIG. 1 is a schematic diagram showing one example of the paper sheets processing system 1 of one embodiment. In a paper sheets processing apparatus 10 of one embodiment, as a paper sheet, for example, a banknote P is processed. Hereinafter, an example that the paper sheet is the banknote P will be explained. However, the paper sheet is not limited to the banknote P.

The paper sheets processing system 1 includes the paper sheets processing apparatus 10, and a plurality of computers (hereinafter, it is called "CP") 21, 22, 23, 24 as respective external devices. The paper sheets processing apparatus 10 includes a control unit to generally control the paper sheets processing apparatus 10. The paper sheets processing apparatus 10 is communicatively connected to CP 21~24 via the control unit 101. As the CP 21~24, a general personal computer can be used. As to the CP 21~24, a program to execute predetermined processing based on data detected by the paper sheets processing apparatus 10 is installed respectively. In the present embodiment, the same program to execute paper sheets processing such as denomination discrimination, authenticity discrimination, and fitness discrimination, is installed. Here, CP 21~CP 24 are collectively called "CP 20".

The paper sheets processing apparatus 10 equips a main unit 100 and a strapping unit 200. The main unit 100 captures an image of a banknote P by transporting the banknote P supplied from a supply unit, and measures the banknote P. The main unit 100 outputs the image and the measurement result to the CP 20. Based on information inputted from the main unit 100, the CP 20 executes denomination discrimination, authenticity discrimination and fitness discrimination, and outputs the discrimination result to the main unit 100. Based on the discrimination result from the CP 20, the main unit 100 sorts banknotes P.

Specifically, the main unit 100 collects a banknote P discriminated as a counterfeit note by the authenticity discrimination of the CP 20, and a banknote P of which transport status is shifted from a regular posture, as rejected banknotes. The main unit 100 erases a banknote P discriminated as an unfit banknote by the fitness discrimination of the CP 20. The main unit 20 exports a banknote P discriminated as a legal tender by the authenticity discrimination and as a fit note by the fitness discrimination of the CP 20, to the strapping unit 200.

In the present embodiment, rejected banknotes include a banknote discriminated as a counterfeit note, a banknote including bend or break, and a banknote unable to decide authenticity by skew or doubled notes. The skew means a status that the banknote P is inclined for the transport direction (i.e., the banknote P is transported with irregular posture). The strapping unit 200 accepts banknotes P discriminated as fit notes from the main unit 100. The strapping unit 200 seals the accepted banknotes P by unit of predetermined sheets, and accommodates a bundle of banknotes into an accommodation unit.

Hereinafter, component of each unit will be explained in detail. The main unit 100 includes the control unit 101, a supply unit 102, a supply mechanism 103, a transport mechanism 104, a detection device 105, a reject unit 106, an accumulation unit 107, and a timing sensor 108. The main unit 100 equips a driving mechanism and a power supply (not shown in Figure) to drive the supply mechanism 103, the transport mechanism 104, the detection device 105, the reject unit 106, the accumulation unit 107 and the timing sensor 108, and other various sensors.

For example, the control unit 101 is set to a control board in the main unit 100. The control unit 101 includes a CPU to control respective operations of the main unit 100 and the strapping unit 200, and a memory to store various data, control program and management information. The CPU 101 executes sending/receiving of information, and information-arrangement.

The supply unit 102 accommodates many banknotes P with lamination status, and, for example, accommodates banknotes P over 2000 sheets with lamination status. The supply unit 102 includes a support side 102*a* inclined a predetermined angle from a vertical side, and a carrying side 102*b* perpendicularly crossing the support side 102*a* at the lowest part of the supply unit 102. The banknote P is carried on the carrying side 102*b*. For example, the banknote P is accommodated into the supply unit 102 under a condition that a side edge of a long side of the banknote P is in contact with the support side 102*a*. The supply mechanism 103 includes a pick-up roller, and exports banknotes into the transport mechanism 104 by picking each banknote P from the lowest part of the supply unit 102.

The transport mechanism 104 transports each banknote P (picked by the supply mechanism 103) along a predetermined transport path. For example, the transport mechanism 104 is composed by a plurality of transport belts without edges (not shown in FIG. 1) elongated so as to put the transported object therebetween. The banknote P (picked by the supply mechanism 103) is sandwiched by the transport belts, and transported from the upper side to the lower side of the transport path. As to the transport path 104 of the transport mechanism 104, a point to pick the banknote P from the supply unit 102 by the supply mechanism 103 is the upper side, and a side where the reject unit 106 and the accumulation unit 107 are located via the detection device 105 is the lower side. The transport path of the transport mechanism 104 is branched to a flow path connected to the reject unit 106 and a flow path connected to the accumulation unit 107 at the lower side.

Figure 2:
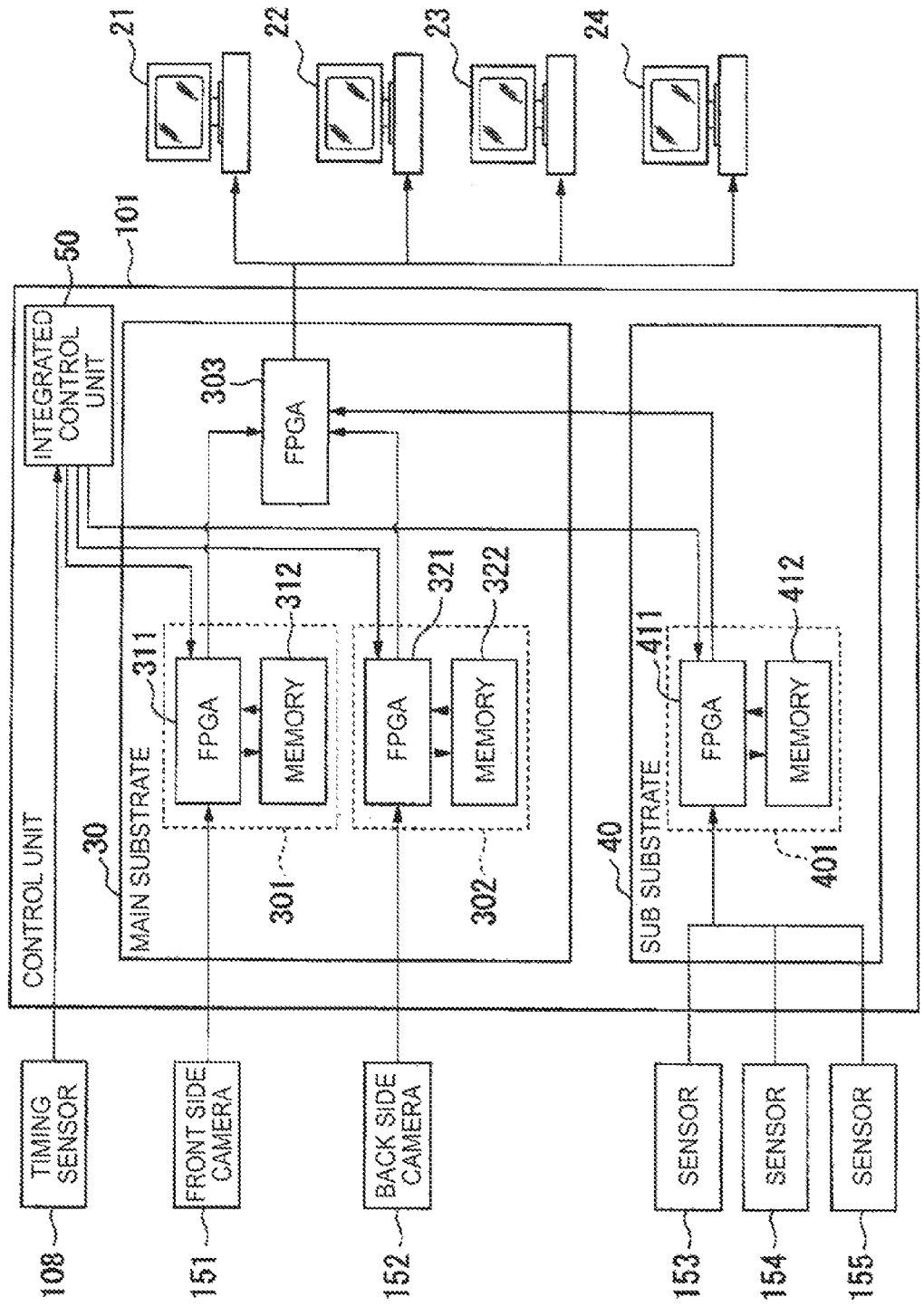
FIG. 2 is a block diagram of a control unit 101 of a paper sheets processing apparatus 10 according to one embodiment.

The detection device 105 detects paper sheets sent by the transport mechanism 104. Furthermore, the detection device 105 detects information to decide a denomination (kind), a shape, a thickness, both sides, an authenticity, fitness and doubled notes of the banknote P, and outputs the detection result to the control unit 101. In the present embodiment, as shown in FIG. 2, the detection device 105 includes a front side camera 151, a back side camera 152, and sensors 153~155. For example, the front side camera 151 and the back side camera 152 are a line sensor respectively. The sensors 153~155 include a physical characteristic detector to detect physical characteristic, and a magnetic detector. The front side camera 151 and the back side camera 152 are set at respective positions to capture both sides of the banknote P moving along the transport direction. Here, the front side and the back side of the banknote P are both sides determined by direction of the banknote P transported. A side captured by the front side camera 151 is the front side, and a side captured by the back side camera 152 is the back side.

The processing of denomination discrimination of the banknote P is processing to detect a kind (1000 yen-bill, 5000 yen-bill, 10000 yen-bill) of the banknote P based on a pattern printed on the banknote P. The processing of authenticity discrimination is processing to decide whether the banknote P is a legal tender or a counterfeit note based on a reflected light from a hologram of the banknote P, or a transmitted light from a watermark of the banknote P. The processing of fitness discrimination is processing to decide whether a fitness level of the banknote P is higher than a reference value based on an image of the banknote P, and to decide whether the banknote P is a fit note or an unfit note. Here, the fit note is a banknote of which fitness level is lower than the reference value and able to be recirculated. The unfit note is a banknote of which fitness level is higher than the reference value and unable to be recirculated.

The reject unit 106 collects paper sheets discriminated as a reject banknote by the control unit 101, based on the detection result of the detection device 105. The reject unit 106 transports banknote P discriminated as reject banknotes to a reject banknote-collection box 106*a* or 106*b*. By indication from the control unit 101, the reject unit 106 may transport reject banknotes discriminated as counterfeit notes to the reject banknote-collection box 106*a*, and transport reject banknotes (For example, skewed banknote P) not discriminated as counterfeit notes to the reject banknote-collection box 106*b*.

The accumulation unit 107 exports banknotes P discriminated as fit notes (based on the detection result by the detection device 105) to accumulation boxes 107*a*, 107*b*, 107*c* (prepared for each kind of banknote P) based on a kind of the banknote P. These accumulation boxes 107*a*, 107*b*, 107*c* are located along one line to respectively accommodate, for example, 1000 yen-bill, 5000 yen-bill, 10000 yen-bill. Furthermore, the accumulation unit 107 exports unfit notes among banknotes P discriminated as fit notes (based on the detection result by the detection device 105) to the accommodation box 107*d*.

The timing sensor 108 is located at the upper side of the transport path of a banknote P than the detection device 105, and detects the banknote P entered into the detection device 105. When the banknote P entered into the detection device 105 is detected, the timing sensor 108 outputs information representing detection of the banknote P to the control unit 101.

Hereinafter, an example of operation of the main unit 100 will be explained. The supply mechanism 103 picks each banknote P accommodated into the supply unit 102, and sends it to the detection device 105. The detection device 105 detects information representing a denomination, a fitness, an authenticity and a transport direction of the banknote P (transported by the transport mechanism 104), and outputs the information to the control unit 101. For example, based on the detection result by the detection device 105, the control unit 101 executes denomination discrimination, authenticity discrimination, and fitness discrimination of each banknote P. Based on the discrimination result, the control unit 101 controls the transport mechanism 104 to export the counterfeit note to the reject unit 106, and to export the legal tender to the accumulation unit 107.

According to control by the control unit 101, the reject unit 106 exports the banknote P discriminated as the reject banknote (by the detection device 105) to the reject banknote-collection box 106*a* or 106*b*.

According to control by the control unit 101, the accumulation unit 107 exports the banknote P (discriminated as the legal tender) to accumulation box 107*a*, 107*b*, 107*c*, based on a kind of the banknote P (discriminated by detection result of the detection device 105). Here, the banknote P discriminated as the unfit note (among banknotes processed by the detection device 105) is exported to the accommodation box 107*d* by the accumulation unit 107.

Based on the detection result by the detection device 105, the CP 20 executes denomination discrimination, authenticity discrimination, and fitness discrimination of the banknote P. For example, the CP 20 discriminates whether the banknote P is a legal tender (true banknote) or a counterfeit note (false banknote), based on image data of the banknote P. The CP 20 discriminates authenticity of the banknote P, based on detection result by sensors 153~155 to detect physical characteristic of the banknote P. For example, if a reflected light from hologram of the banknote P or a transmitted light from a watermark thereof is a predetermined pattern, the CP 20 discriminates that the banknote P is the legal tender. Furthermore, for example, if a magnetic power included in the banknote P is within a predetermined range, the CP 20 discriminates that the banknote P is the legal tender.

Furthermore, if the banknote P discriminated as the legal tender can be recirculated, the CP 20 discriminates the banknote P as a fit note. If the banknote P discriminated as the legal tender cannot be recirculated, the CP 20 discriminates the banknote P as an unfit note. The CP 20 detects unfitness such as dirt or a break stuck on the banknote P. The CP 20 calculates a fitness level representing a size of a dirt region on the banknote P, the number of dirt on the banknote P, a size of break on the banknote P, or the number of break on the banknote P. By compare the fitness level with a reference value, if the fitness level is lower than the reference value, the CP 20 discriminates the banknote P as the fit note. On the other hand, if the fitness level is higher than the reference value, the CP 20 discriminates the banknote P as the unfit note.

The paper sheets processing apparatus 10 of the present embodiment processes several thousand banknotes P per one minute. Accordingly, if processing (For example, denomination discrimination, authenticity discrimination, fitness discrimination) of the banknote P by the CP 20 is delayed, a speed to process the banknote P by the paper sheets processing apparatus 10 may be lowered, or processing thereof may be stopped on the way. In the present embodiment, by distributing processing (For example, denomination discrimination, authenticity discrimination, fitness discrimination) of each banknote P by the CP 20 to a plurality of CP 20, the banknote P can be effectively processed, and processing load of the CP 20 can be reduced. As a result, the paper sheets processing apparatus 10 can quickly process the banknote P.

Next, by referring to FIG. 2, a component example of the control unit 101 of the paper sheets processing apparatus 10 of the present embodiment will be explained. FIG. 2 is a block diagram of the component example of the control unit 101 of the paper sheets processing apparatus 10 of the present embodiment.

As shown in FIG. 2, the control unit 101 equips a main substrate 30, a sub substrate 40, and an integrated control unit 50. For example, the integrated control unit 50 is loaded onto any of the main substrate 30 or the sub substrate 40. The main substrate 30 equips a sub controller 301, a sub controller 302, and a FPGA (field-programmable gate array) 303.

The sub controller 301 equips a FPGA 311 and a memory 312. The FPGA 311 is a sub controller corresponding to the front side camera 151, which generates image data based on an output from the front side camera 151, and stores the image data into the memory 312. The FPGA 311 decides whether one image data is stored into the memory 312. If it is decided that one image data is stored into the memory 312, the FPGA 311 outputs a request command to the FPGA 303. When a reply command is inputted from the FPGA 303, the FPGA 311 reads the image data from the memory 312, and outputs the image data to the FPGA 303.

The sub controller 302 equips a FPGA 321 and a memory 322. The FPGA 321 is a sub controller corresponding to the back side camera 152, which generates image data based on an output from the back side camera 152, and stores the image data into the memory 322. The FPGA 321 decides whether one image data is stored into the memory 322. If it is decided that one image data is stored into the memory 322, the FPGA 321 outputs a request command to the FPGA 303. When a reply command is inputted from the FPGA 303, the FPGA 321 reads the image data from the memory 322, and outputs the image data to the FPGA 303.

The FPGA 303 is a main controller to transfer the image data (inputted from the FPGA 311 or the FPGA 321 as the sub controller) to any one (predetermined) CP of CP 21~CP 24. The FPGA 303 transfers the image data of the same banknote P (inputted from the FPGA 311 or the FPGA 321) to any one CP of CP 21~CP24. In the present embodiment, if the FPGA 303 is transferring data to any one CP of CP 21~CP 24, the FPGA 303 does not transfer another data until this data transfer is completed.

The sub substrate 40 equips a sub controller 401. The sub controller 401 equips a FPGA 411 and a memory 412. The FPGA 411 is a sub controller corresponding to sensors 153~155, which generates sensor data based on respective outputs from the sensors 153~155, and stores them into the memory 412. In the present embodiment, for example, the FPGA 411 generates one sensor data file by collecting a group of sensor data outputted from the sensors 153~155. The FPGA 411 decides whether the sensor data file (one group of sensor data) is stored into the memory 412. If the sensor data file (one group of sensor data) is stored into the memory 412, the FPGA 411 outputs a request command to the FPGA 303. When a reply command is inputted from the FPGA 303, the FPGA 411 reads the sensor data file from the memory 412, and outputs the sensor data file to the FPGA 303.

The FPGA 303 is a main controller to transfer the sensor data file (inputted from the FPGA 411 as the sub controller) to any one (predetermined) CP of CP 21~CP 24. The FPGA 303 transfers the sensor data file of the same banknote P (inputted from the FPGA 411) to any one CP of CP 21~CP24.

When the timing sensor 108 (located in front of the front side camera 151) detects the banknote P, the integrated control unit 50 assigns an identifier (Hereinafter, it is called "banknote ID") to one banknote P detected by the timing sensor 108. The integrated control unit 50 simultaneously outputs a banknote ID (assigned) to the FPGA 311, 321, 411.

Based on transport order of the banknote P, the integrated control unit 50 determines a transfer destination of the image data (or the sensor file data), and outputs information (Hereinafter, it is called "transfer destination information") representing the transfer destination to the FPGA 311, 321, 411. In the present embodiment, the integrated control unit 50 determines a transfer destination of data of banknotes P1, P2, P3, P4 transported in order of the first, second, third, fourth, as CP 21, CP 22, CP 23, CP 24, respectively. Continually, the integrated control unit 50 determines a transfer destination of data of banknotes P5, P6, P7, P8 transported in order of the fifth, sixth, seventh, eighth, as CP 21, CP 22, CP 23, CP 24, respectively. Here, when the transfer destination is determined as CP 21, CP 22, CP 23, CP 24, the integrated control unit 50 outputs transfer destination information "01", "02", "03", "04", to the FPGA 311, 321, 411.

Figure 3:
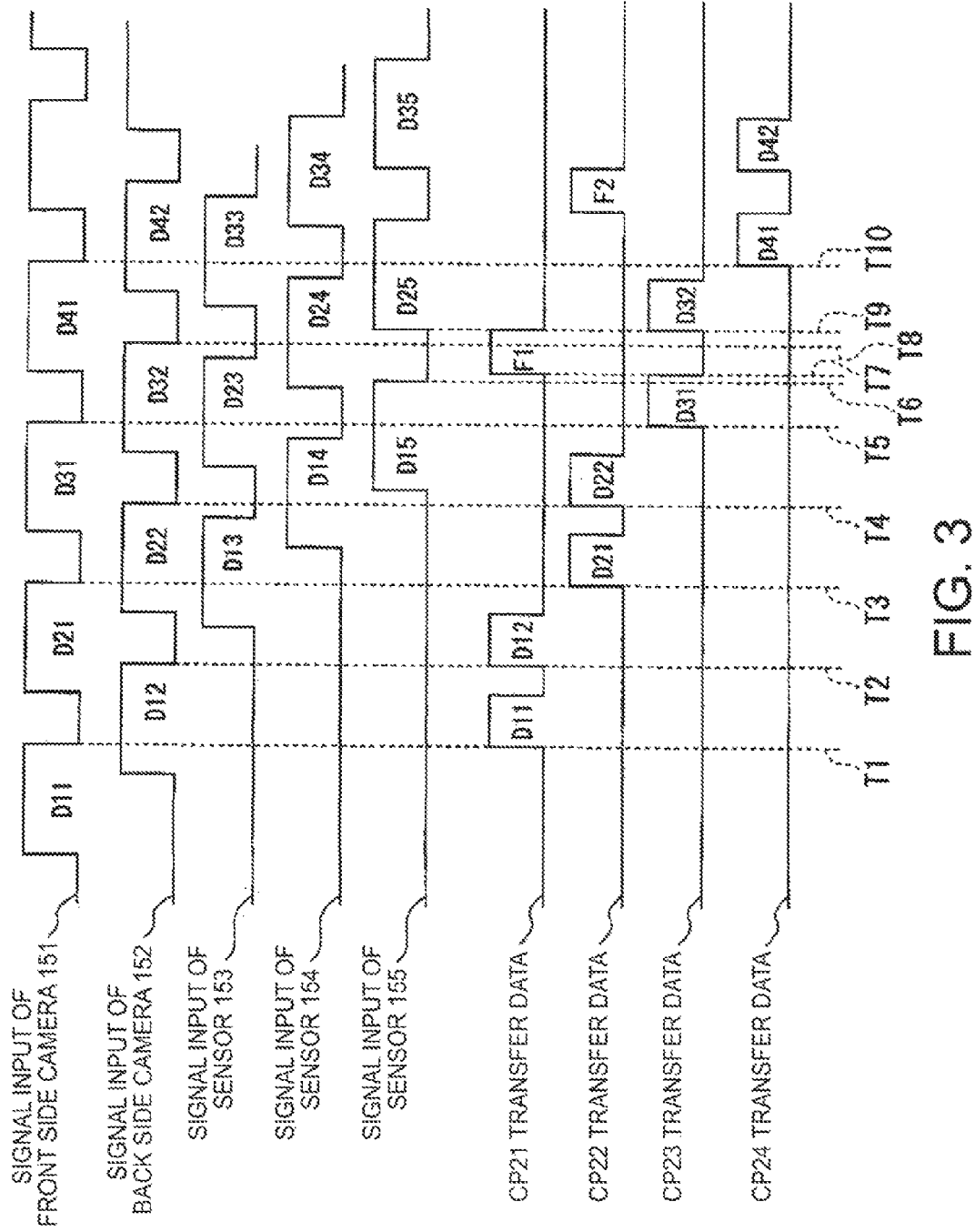
FIG. 3 is a timing chart to explain an example of data transfer by a main control unit (FPGA 303).

Next, an example of data transfer by the main controller (FPGA 303) will be explained by referring to FIG. 3. FIG. 3 is a timing chart to explain the example of data transfer by the main controller (FPGA 303). In the timing chart, a horizontal axis is a time axis.

When a first banknote P1 reaches an imaging position of the front side camera 151 by being transported onto the transport path, the front side camera 151 captures an image of the banknote P1. Based on an output signal from the front side camera 151, the FPGA 311 of the sub controller 301 generates image data D11, and stores the image data D11 into the memory 312. A time when the image data D11 is stored into the memory 312 is T1. At T1, the main controller (FPGA 303) is not transferring data to the CP 20 (i.e., during non-transferring). Accordingly, the FPGA 311 outputs the image data D11 to the FPGA 303. Here, the transport order of the banknote P1 is number one. As a result, the FPGA 303 outputs the image data D11 (inputted from the FPGA 311) to the CP 21.

When the banknote P1 further reaches an imaging position of the back side camera 152 by being transported onto the transport path, the back side camera 152 captures an image of the banknote P1. Based on an output signal from the back side camera 152, the FPGA 321 of the sub controller 302 generates image data D12, and stores the image data D12 into the memory 322. A time when the image data D12 is stored into the memory 322 is T2. At T2, the main controller (FPGA 303) is not transferring data to the CP 20 (i.e., during non-transferring). Accordingly, the FPGA 321 outputs the image data D12 to the FPGA 303. Here, the transport order of the banknote P1 is number one. As a result, the FPGA 303 outputs the image data D12 (inputted from the FPGA 321) to the CP 21.

When a second banknote P2 reaches an imaging position of the front side camera 151 by being transported onto the transport path, the front side camera 151 captures an image of the banknote P2. Based on an output signal from the front side camera 151, the FPGA 311 of the sub controller 301 generates image data D21, and stores the image data D21 into the memory 312. A time when the image data D21 is stored into the memory 311 is T3. At T3, the main controller (FPGA 303) is not transferring data to the CP 20 (i.e., during non-transferring). Accordingly, the FPGA 311 outputs the image data D21 to the FPGA 303. Here, the transport order of the banknote P2 is number two. As a result, the FPGA 303 outputs the image data D21 (inputted from the FPGA 311) to the CP 22.

In the same way, at T4 when the second banknote P2 is imaged by the back side camera 152 and image data D22 is stored into the memory 322, the FPGA 303 is not transferring data (i.e., during non-transferring). Accordingly, the FPGA 321 outputs the image data D22 to the FPGA 303. Here, the transport order of the banknote P2 is number two. As a result, the FPGA 303 outputs the image data D22 (inputted from the FPGA 321) to the CP 22.

At T5 when a third banknote P3 is imaged by the front side camera 151 and image data D31 is stored into the memory 312, the FPGA 303 is not transferring data (i.e., during non-transferring). Accordingly, the FPGA 311 outputs the image data D31 to the FPGA 303. Here, the transport order of the banknote P3 is number three. As a result, the FPGA 303 outputs the image data D31 (inputted from the FPGA 311) to the CP 23.

When the first banknote P1 further reaches measuring positions of sensors 153~155 by being transported onto the transport path, the sensors 153~155 respectively measure the banknote P1. Based on output signals from the sensors 153~155, the FPGA 411 of the sub controller 401 generates sensor data D13~D15. The FPGA 411 generates a sensor data file F1 by collecting a group of sensor data D13~D15, and stores the sensor data file F1 into the memory 412. A time when the sensor data file F1 is stored into the memory 412 is T6. At T6, the main controller (FPGA 303) is transferring data to the CP 20 (i.e., during transferring). Accordingly, the FPGA 303 indicates the FPGA 411 to output the sensor data file F1 just after T7 when transferring of the image data D31 is completed. According to the indication from the FPGA 303, the FPGA 411 outputs the sensor data file F1 to the FPGA 303. Here, the transport order of the banknote P1 is number one. As a result, the FPGA 303 outputs the sensor data file F1 (inputted from the FPGA 411) to the CP 21.

When the third banknote P3 further reaches an imaging position of the back side camera 152 by being transported onto the transport path, the back side camera 152 captures an image of the banknote P3. Based on an output signal from the back side camera 152, the FPGA 321 of the sub controller 302 generates image data D32, and stores the image data D32 into the memory 322. A time when the image data D32 is stored into the memory 322 is T8. At T8, the main controller (FPGA 303) is transferring data to the CP 20 (i.e., during transferring). Accordingly, the FPGA 303 indicates the FPGA 321 to output the image data D32 just after T9 when transferring of the sensor data file F1 is completed. According to the indication from the FPGA 303, the FPGA 321 outputs the image data D32 to the FPGA 303. Here, the transport order of the banknote P3 is number three. As a result, the FPGA 303 outputs the image data D31 (inputted from the FPGA 321) to the CP 23.

Figure 4:
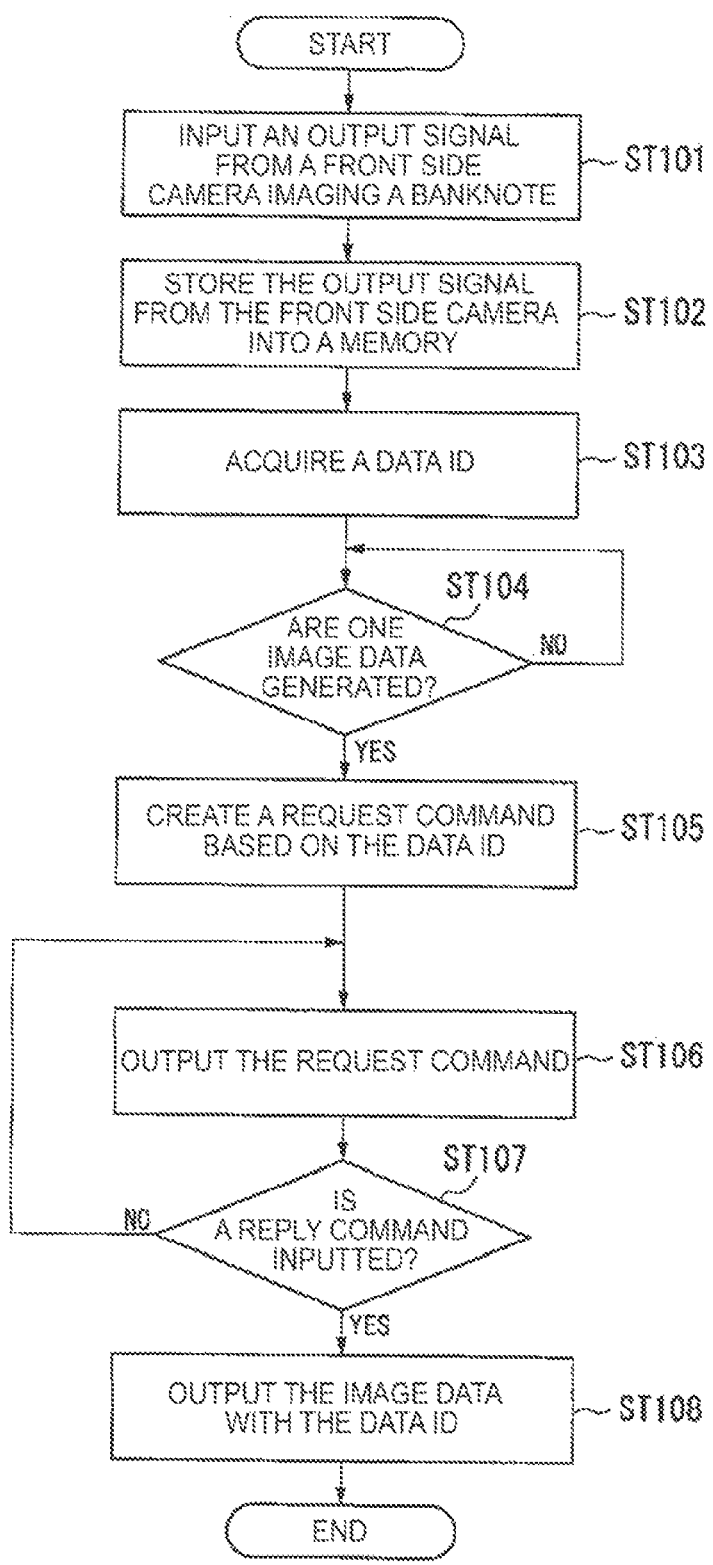
FIG. 4 is a flow chart to explain one example of processing of a sub control unit 301.

Next, an example of processing by the sub controller 301 of the present embodiment will be explained by referring to FIG. 4. FIG. 4 is a flow chart to explain the example of processing by the sub controller 301 of the present embodiment. Here, the sub controller 302 performs the same processing as the sub controller 301 explained hereafter. Accordingly, explanation for processing of the sub controller 302 is omitted.

The front side camera 151 images a front side of the banknote P1 transported onto a predetermined transport path in the main unit 100 by the transport mechanism 104, and outputs an acquired signal. The FPGA 311 inputs an output signal from the front side camera 151 (ST101). The FPGA 311 stores the output signal from the front side camera 151 to the memory 312 (ST102). Next, the FPGA 311 acquires a banknote ID from the integrated control unit 50 (ST103). In the present embodiment, when the output signal from the front side camera 151 is inputted, the FPGA 311 decides that an image of the banknote P1 is captured. The FPGA 311 acquires a banknote ID "001" of the banknote P1 from the integrated control unit 50. Here, the integrated control unit 50 determines the CP 20 (any of CP 21~CP 24) as a transfer destination of the image data D11, and outputs information representing the CP 20 (any of CP 21~CP 24) to the FPGA 311. For example, the integrated control unit 50 determines the CP 21 as the transfer destination of data of the first banknote P1, and outputs transfer destination information "01" representing the CP 21 to the FPGA 311.

When an output signal of one image is stored into the memory 312, the FPGA 311 generates one image data based on the output signal stored in the memory 312. When one image data D11 of the banknote P1 is generated (Yes at ST104), the FPGA 311 stores the image data D11 into the memory 312, and creates a request command based on the banknote ID "001" received from the integrated control unit 50 (ST105). As the request command, the FPGA 311 creates information to request transferring of the image data D11 (a front side of the banknote P1 is imaged). For example, the FPGA 311 creates the request command as information "A001" by combining information "A" representing an image captured by the front side camera 151 with the banknote ID "001". The FPGA 311 outputs the request command "A001" to the FPGA 303 (ST106).

Then, the FPGA 311 decides whether a reply command is inputted from the FPGA 303 (ST107). If the reply command is inputted (Yes at ST107), the FPGA 311 reads the image data D11 of the banknote P1 from the memory 312, and outputs the image data D11 in correspondence with the banknote ID "001" and the transfer destination information "01" to the FPGA 303 (ST108).

Figure 5:
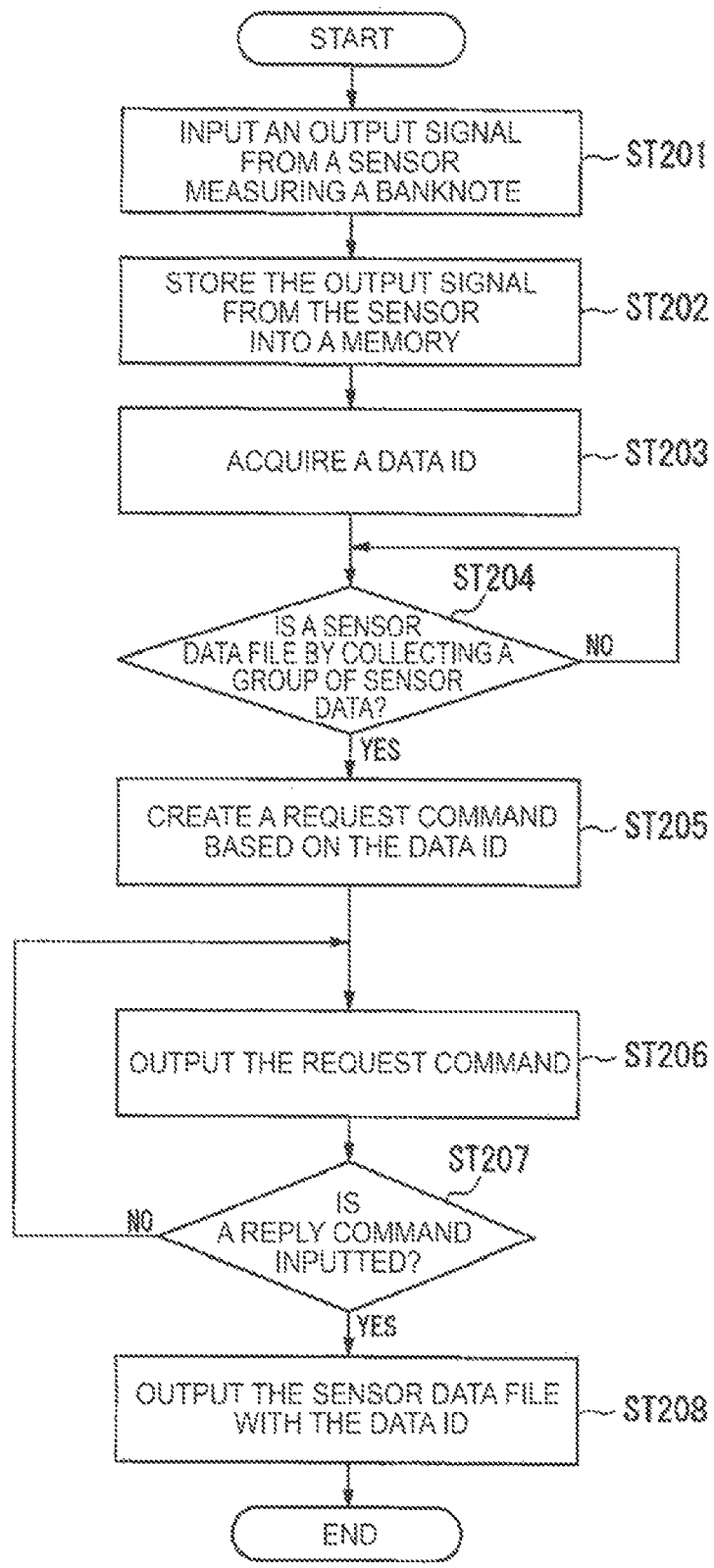
FIG. 5 is a flow chart to explain one example of processing of a sub control unit 401.

Next, an example of processing by the sub controller 401 of the present embodiment will be explained by referring to FIG. 5. FIG. 5 is a flow chart to explain the example of processing by the sub controller 401 of the present embodiment.

The sensors 153~155 measure the banknote P1 transported onto a predetermined transport path in the main unit 100 by the transport mechanism 104, and outputs acquired signals. The FPGA 411 inputs output signals from the sensors 153~155 (ST201). The FPGA 411 stores the signals inputted from the sensors 153~155 to the memory 412 (ST202). Based on the signals inputted from the sensors 153~155, the FPGA 411 generates sensor data D13~D15, and stores them into the memory 412.

The FPGA 411 acquires a banknote ID from the integrated control unit 50 (ST203). For example, the FPGA 411 acquires a banknote ID "001" of the banknote P1 from the integrated control unit 50. Here, the integrated control unit 50 determines the CP 20 (any of CP 21~CP 24) as a transfer destination of the sensor data D13~D15, and outputs information representing the CP 20 (any of CP 21~CP 24) to the FPGA 411. The integrated control unit 50 determines the CP 21 as the transfer destination of data of the first banknote P1, and outputs transfer destination information "01" representing the CP 21 to the FPGA 411.

When one group of sensor data D13~D15 is stored into the memory 412, the FPGA 411 generates a sensor data file F1 by collecting the one group of sensor data D13~D15 stored in the memory 412. When the sensor data file F1 of the banknote P1 is generated (Yes at ST204), the FPGA 411 stores the sensor data file F1 into the memory 412, and creates a request command based on the banknote ID "001" received from the integrated control unit 50 (ST205). As the request command, the FPGA 411 creates information to request transferring of the sensor data D11 of the banknote P1. For example, the FPGA 411 creates the request command as information "C001" by combining information "C" representing sensor data detected by the sensors 153~155 with the banknote ID "001". The FPGA 411 outputs the request command "C001" to the FPGA 303 (ST206).

Then, the FPGA 411 decides whether a reply command is inputted from the FPGA 303 (ST207). If the reply command is inputted (Yes at ST207), the FPGA 411 reads the sensor data file F1 of the banknote P1 from the memory 412, and outputs the sensor data file F1 in correspondence with the banknote ID "001" and the transfer destination information "01" to the FPGA 303 (ST208).

Figure 6:
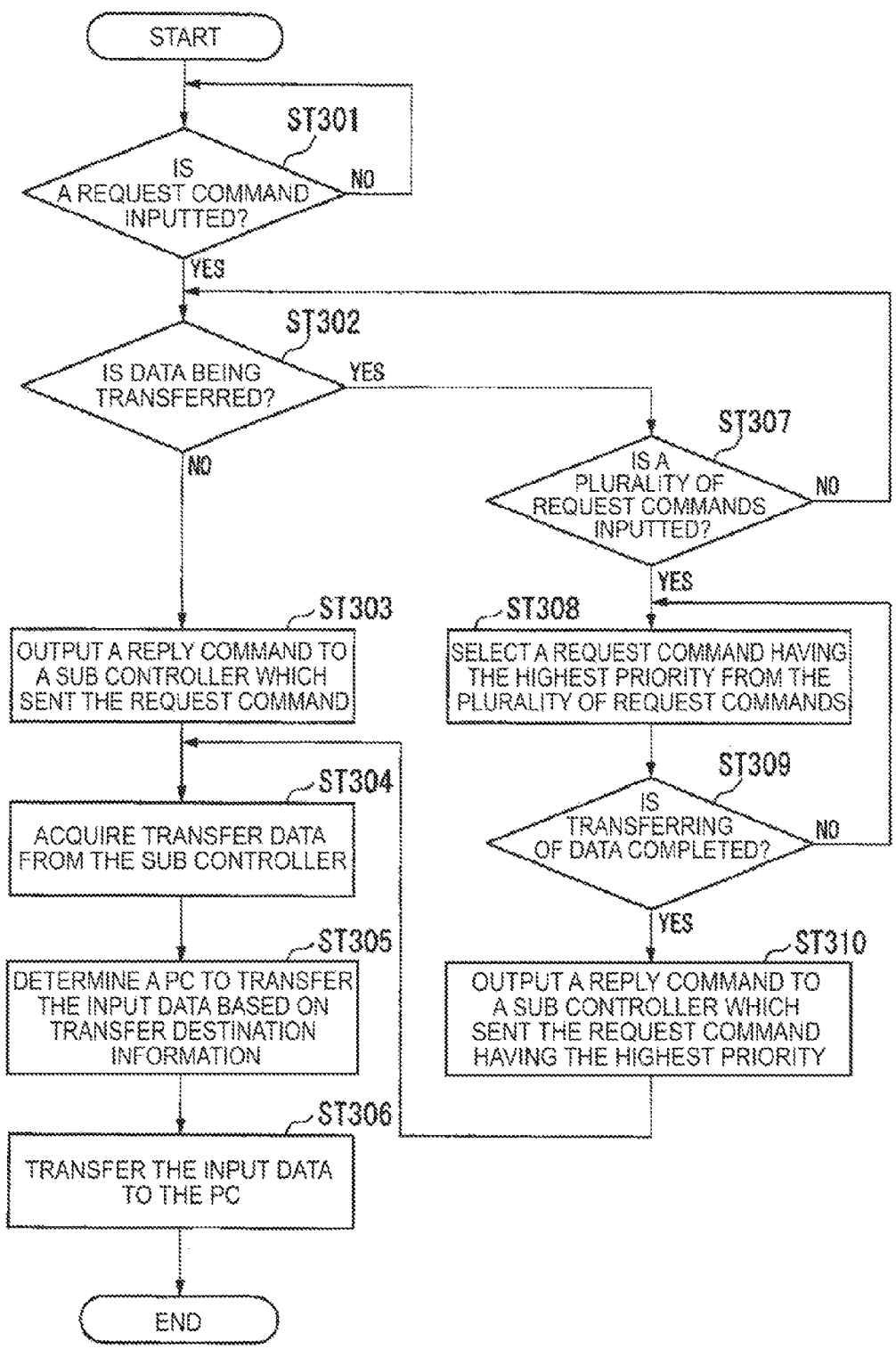
FIG. 6 is a flow chart to explain one example of processing of the main control unit (FPGA 303).

Next, an example of processing by the main controller (FPGA 303) of the present embodiment will be explained by referring to FIG. 6. FIG. 6 is a flow chart to explain the example of processing by the main controller (FPGA 303) of the present embodiment.

The FPGA 303 decides whether the request command is inputted (ST301). If the request command is inputted (Yes at ST301), the FPGA 303 decides whether data is being transferred to any of CP 21~24 (ST302). If data is not being transferred to any of CP 21~24 (No at ST302), the FPGA 303 outputs a replay command to allow output of data to the sub controller (FPGA 311, 321, 411) which sent the request command (ST303). Then, the FPGA 303 acquires the transfer destination information from the sub controller (FPGA 311, 321, 411) which sent the request command (ST304), and determines CP 20 (any of CP 21~24) to transfer data from the sub controller (FPGA 311, 321, 411) based on the transfer destination information (ST306).

For example, under a status that data is not being transferred to any of CP 21~24, when the request command is inputted from the FPGA 311, the FPGA 303 outputs the reply command to the FPGA 311. When the reply command is inputted from the FPGA 303, for example, the FPGA 311 reads image data D1 of the banknote P1 from the memory 312, and outputs the image data D1 in correspondence with the banknote ID "001" and the transfer destination information "01" to the FPGA 303. Based on the transfer destination information "01" inputted from the FPGA 311, the FPGA 303 determines the CP 21 as the transfer destination, and transfers the image data D1 to the CP 21.

On the other hand, if data is being transferred to any of CP 21~23 (Yes at ST302), the FPGA 303 decides whether a plurality of request commands is inputted from the sub controller (FPGA 311, 321, 411) (ST307). If the plurality of request commands is not inputted, the FPGA 303 repeats processing by returning to ST302.

If the plurality of request commands is inputted from the sub controller (FPGA 311, 321, 411) while data is being transferred, the FPGA 303 selects a request command having the highest priority from the plurality of request commands inputted (ST308). Then, when transferring of data is completed (Yes at ST309), the FPGA 303 outputs the reply command to the sub controller (FPGA 311, 321, 411) which sent the request command having the highest priority (ST310). By executing processing of ST304~306, the FPGA 303 accepts data from the sub controller (FPGA 311, 321, 411) which sent the request command having the highest priority, and transfers the data to the determined CP 20 (any of CP 21~24).

For example, based on the banknote ID included in the request command, the FPGA 303 determines a request command having the highest priority. In the present embodiment, as the banknote ID, the integrated control unit 50 assigns a number in ascending order according to transport order of the banknote P. The FPGA 303 decides a request command having the smallest banknote ID as the request command having the highest priority.

Furthermore, based on a type of data inputted from the sub controller (FPGA 311, 321, 411), the FPGA 303 may determine the request command having the highest priority. For example, among detectors included in the detection device 105, a request command from a detector located at the lowest side along the transport direction of the banknote P may be decided as the request command having the highest priority.

In the present embodiment, the FPGA 401 outputs sensor data from the sensor 155 located at the lowest side along the transport direction, to the FPGA 303. Accordingly, the FPGA 303 decides the request command from the FPGA 411 as the request command having the highest priority. As a result, processing for the banknote P transported at an earlier time can be preferentially executed by the CP 20.

Furthermore, based on timing when the sub controller (FPGA 311, 321, 411) outputs data of the same banknote P, the FPGA 303 may determine the request command having the highest priority. For example, among sub controllers (FPGA 311, 321, 411), a request command from the sub controller which outputted data (image data or sensor data) of the same banknote P at the latest timing may be decided as the request command having the highest priority.

In the present embodiment, among sub controllers (FPGA 311, 321, 411), the FPGA 411 is the sub controller which outputted data of the same banknote P at the latest timing. Accordingly, the FPGA 303 decides the request command from the FPGA 411 as the request command having the highest priority. As a result, processing for the banknote P transported at an earlier time can be preferentially executed by the CP 20.

Figure 7:
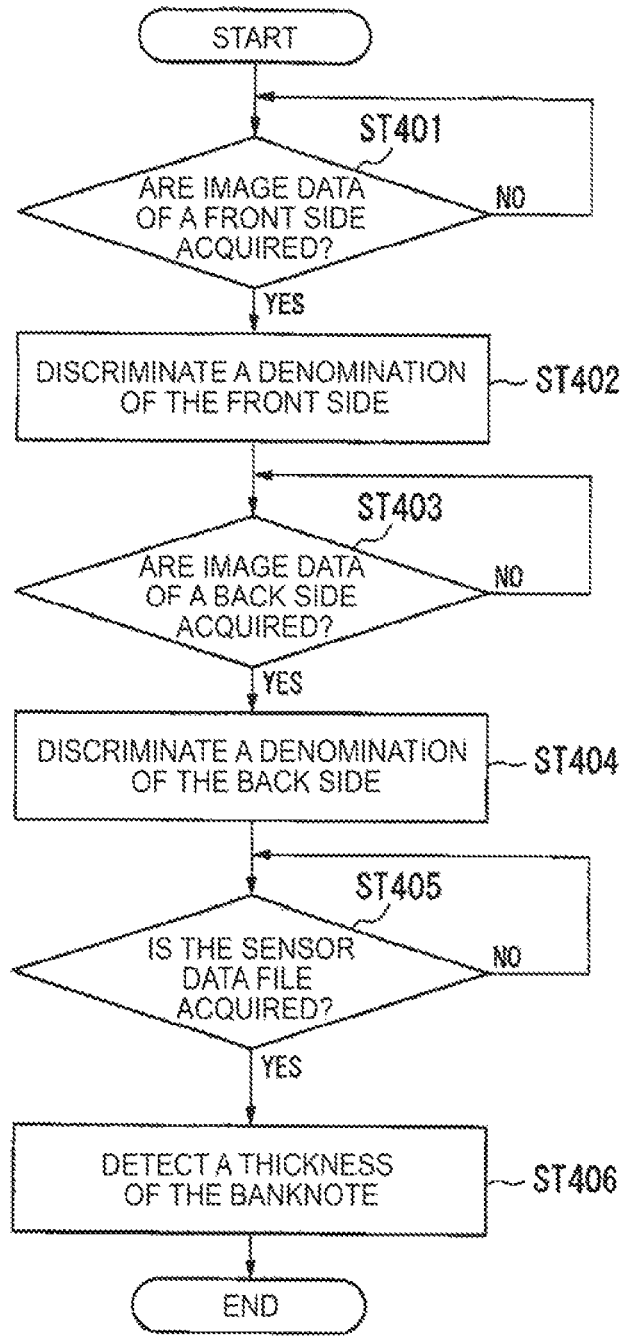
FIG. 7 is a flow chart to explain one example of processing of a CP 20.

Next, an example of processing by the CP 20 of the present embodiment will be explained by referring to FIG. 7. FIG. 7 is a flow chart to explain the example of processing by the CP 20 of the present embodiment. Here, processing by the CP 21 will be explained as the example. The same program as the CP 21 is installed into the CP 22~24 which executes the same processing respectively. Accordingly, explanation for processing of the CP 22~24 is omitted.

The CP 21 decides whether image data of the front side of the banknote is acquired (ST401). In the present embodiment, a file name of the image data includes information representing whether the image data is captured by the front side camera 151 or the back side camera 152. Based on the file name, the CP 21 decides whether the image data is the front side image.

If the image data is the front side image, the CP 21 executes discrimination processing of denomination of the front side (ST402). For example, by analyzing the image data, the CP 21 discriminates a denomination of the banknote P based on a pattern or a color included in the image data.

The CP 21 decides whether image data of the back side of the banknote is acquired (ST403). If the image data is the back side image, the CP 21 executes discrimination processing of denomination of the back side (ST404).

Next, the CP 21 decides whether the sensor data file is acquired (ST405). If the sensor data file is acquired, the CP 21 executes detection processing of a thickness of the banknote (ST406). Here, this processing is not limited to detection processing of the thickness. The CP 21 may execute authenticity discrimination or fitness discrimination.

In above-mentioned embodiment, the sub controller is explained as the FPGA. However, the sub controller may be hardware functional unit such as CPU (Central Processing Unit), LSI (Large Scale Integration), or IC (Application Specific Integrated Circuit).

In above-mentioned embodiment, when the FPGA 303 transfers data acquired from the sub controller (FPGA 311, 321, 411) to the CP 20, the FPGA 303 may transfer the data in correspondence with the request command. The request command includes information which any of "A" representing the transfer data captured by the front side camera 151, "B" representing the transfer data captured by the back side camera 152, and "C" representing the sensor data detected by the sensors 153~155, is combined with the banknote ID. By sending the request command from the FPGA 303 to the CP 20, the CP 20 can decide that a transfer source of the transfer data is which unit (the front side camera 151, the back side camera 152, the sensors 153~155) in the detection device 105, based on the request command.

In above-mentioned embodiment, the integrated control unit 50 outputs transfer destination information to each sub controller (FPGA 311, 321, 411). However, the output processing by the integrated control unit 50 is not limited to this. For example, the integrated control unit 50 may output information including the banknote ID corresponded with the transfer destination information to the FPGA 303 (main controller). In this case, the FPGA 303 stores information received from the integrated control unit 50 into a stored memory. The FPGA 303 retrieves the transfer destination information corresponding to the banknote ID corresponded with data (inputted from the sub controller (FPGA 311, 321, 411)) from the stored memory, and transfers the image data or the sensor data to the CP 20 (any of CP 21~24) indicated by the transfer destination information.

In above-mentioned embodiment, the FPGA 401 generates a sensor data file by collecting one group of sensor data. However, the generation processing by the FPGA 401 is not limited to this. The FPGA 401 may output one group of sensor data related to the same banknote P to the FPGA 303 at the same time.

In above-mentioned embodiment, paper sheets processed by the paper sheets processing apparatus 10 is not limited to banknotes. For example, the paper sheets may be another sheet such as game cards or securities.

In above-mentioned embodiment, when the banknote P is imaged by the front side camera 151 or the back side camera 152, or when the banknote P is measured by the sensors 153~155, the integrated control unit 50 may assign one banknote ID to one banknote P.

According to at least one of above-mentioned embodiments, the main controller (FPGA 303) inputs image data and sensor data related to the same banknote from the sub controller (FPGA 311, 321, 411), and transfers them to one CP indicated from a plurality of CPs 21~24. Accordingly, the processing load can be effectively distributed.

Furthermore, by transferring the image data and sensor data related to the same banknote P to one CP, the CP 21~24 can respectively execute all processing (denomination discrimination, authenticity discrimination, fitness discrimination) related to the same banknote P. Accordingly, respective programs to be installed into the CP 21~24 can be same one, and management processing of the CP 20 can be reduced. Furthermore, based on detection result from the detection device 105, the CP 21~24 can comprehensively perform decision related to one banknote P.

Furthermore, the main controller (FPGA 303) transfers image data and sensor data of a plurality of banknotes P transported in different orders to different CPs 20 (any of CP 21~24) respectively. As a result, concentration of processing to one CP 20 is prevented, and the processing load can be equally distributed.

Furthermore, the sub controllers 301, 302, 401 equip the respective memories 312, 322, 412 to store data to be transferred to the main controller (FPGA 303). As a result, the sub controllers 301, 302, 401 can adjust timing to transfer data to the main controller.

Furthermore, an interval to transport respective banknotes P is uneven, and an interval to detect the respective banknotes P by the detection device 105 is also uneven. Here, timing when the detection result is inputted to the sub controllers 301, 302, 401 depends on timing when the banknote P is transported. Accordingly, the respective intervals are varied. As a result, while the data is being transferred, a plurality of request commands may be inputted to the main controller (FPGA 303). In this case, even if the plurality of request commands is inputted to the FPGA 303, the FPGA 303 preferentially transfers information of a banknote P antecedently transported in comparison with information of another banknote P subsequently transported, to the CP 20. As a result, the CP 20 can execute processing of the respective banknotes P based on the transport order, and return the processing result to the control unit 101.

Furthermore, the integrated control unit 50 assigns the same identifier (banknote ID) to image data and sensor data of the same banknote, and the main controller (FPGA 303) transfers the image data and the sensor data to the CP 20 (any of CP 21~24) determined based on the identifier (banknote ID). As a result, information of the same banknote can be simply transferred to the same CP 20.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An apparatus for processing paper sheets, comprising:
   a first sub controller that generates image data, based on an output signal from a camera which captures an image of a banknote transported along a transport path;
   a second sub controller that generates sensor data, based on an output signal from a sensor which measures the banknote; and
   a main controller that inputs the image data and the sensor data of the same banknote from the first sub controller and the second sub controller, and transfers the image data and the sensor data to one external device indicated from a plurality of external devices,
   wherein the main controller transfers the image data and the sensor data of respective banknotes transported in order, to one external device selected from the external devices in a transport order of the respective banknotes.

2. The apparatus according to claim 1, wherein
   the main controller determines any of the first sub controller and the second sub controller to allow to transfer based on a transport order of the banknote, and indicates the determined sub controller to output the image data or the sensor data,
   the first sub controller stores the image data into a first storage unit, and outputs the image data read from the first storage unit to the main controller in response to an indication from the main controller, and
   the second sub controller stores the sensor data into a second storage unit, and outputs the sensor data read from the second storage unit to the main controller in response to an indication from the main controller.

3. The apparatus according to claim 1, wherein
   the main controller transfers the image data and the sensor data of a first banknote antecedently transported, earlier than the image data and the sensor data of a second banknote subsequently transported, to the external device.

4. The apparatus according to claim 1, further comprising:
   an integrated control unit that assigns the same identifier to the image data and the sensor data of the same banknote,
   wherein the main controller transfers the image data and the sensor data to the external device previously determined based on the identifier.

5. The apparatus according to claim 4, wherein
   the integrated control unit determines an identifier of respective banknotes based on a transport order of the respective banknotes along the transport path, selects a transfer destination of the image data and the sensor data of the respective banknotes from the plurality of external devices based on the transport order, and outputs the identifier and the transfer destination of the respective banknotes to the first sub controller and the second sub controller.

6. The apparatus according to claim 5, wherein,
   after receiving the identifier and the transfer destination from the integrated control unit,
   the respective sub controllers create a request command including the identifier and requesting transferring of the image data or the sensor data, and outputs the request command to the main controller.

7. The apparatus according to claim 6, wherein,
   after receiving the request command from at least one of the respective sub controllers,
   the main controller decides whether data is being transferred to any of the plurality of external devices,
      if the data is being transferred to none of the plurality of external devices, outputs a reply command to allow transferring to the at least one sub controller, and,
      if the data is being transferred to any of the plurality of external devices, when transferring of the data is completed, outputs the reply command to the at least one sub controller.

8. The apparatus according to claim 7, wherein,
   after receiving the reply command from the main controller,
   the at least one sub controller outputs the image data or the sensor data in correspondence with the identifier and the transfer destination to the main controller.

9. A method for transferring data, comprising:
   generating by a first sub controller, image data based on an output signal from a camera which captures an image of a banknote transported along a transport path;
   generating by a second sub controller, sensor data based on an output signal from a sensor which measures the banknote;
   assigning by an integrated control unit, the same identifier to the image data and the sensor data of the same banknote; and
   transferring by a main controller, the image data and the sensor data having the same identifier to one external device indicated from a plurality of external devices.

10. The method according to claim 9, wherein
    the transferring by the main controller comprises
    transferring the image data and the sensor data of respective banknotes transported in different orders, to the external devices differently.

11. The method according to claim 9, wherein
    the transferring by the main controller comprises
    determining any of the first sub controller and the second sub controller to allow to transfer based on a transport order of the banknote; and
    indicating the determined sub controller to output the image data or the sensor data,
    the generating by the first sub controller comprises
    storing the image data into a first storage unit; and
    outputting the image data read from the first storage unit to the main controller in response to an indication from the main controller,
    the generating by the second sub controller comprises
    storing the sensor data into a second storage unit; and outputting the sensor data read from the second storage unit to the main controller in response to an indication from the main controller.

12. The method according to claim 9, wherein
the transferring by the main controller comprises
transferring the image data and the sensor data of a first banknote antecedently transported, earlier than the image data and the sensor data of a second banknote subsequently transported, to the external device.

13. The method according to claim 9, wherein
the transferring by the main controller comprises
transferring the image data and the sensor data having the same identifier to the external device previously determined based on the same identifier.

14. The method according to claim 13, wherein
the assigning by the integrated control unit comprises
determining an identifier of respective banknotes based on a transport order of the respective banknotes along the transport path;
selecting a transfer destination of the image data and the sensor data of the respective banknotes from the plurality of external devices, based on the transport order; and
outputting the identifier and the transfer destination of the respective banknotes to the first sub controller and the second sub controller.

15. The method according to claim 14, wherein
the generating by the respective sub controllers comprises,
after receiving the identifier and the transfer destination from the integrated control unit,
creating a request command including the identifier and requesting transferring of the image data or the sensor data; and
outputting the request command to the main controller.

16. The method according to claim 15, wherein
the transferring by the main controller comprises,
after receiving the request command from at least one of the respective sub controllers,
deciding whether data is being transferred to any of the plurality of external devices;
  if the data is being transferred to none of the plurality of external devices, outputting a reply command to allow transferring to the at least one sub controller; and,
  if the data is being transferred to any of the plurality of external devices, when transferring of the data is completed, outputting the reply command to the at least one sub controller.

17. The method according to claim 16, wherein
the generating by the at least one sub controller comprises,
after receiving the reply command from the main controller,
  outputting the image data or the sensor data in correspondence with the identifier and the transfer destination to the main controller.

* * * * *